United States Patent
Tsunoda et al.

(10) Patent No.: US 10,293,864 B2
(45) Date of Patent: May 21, 2019

(54) VEHICLE WITH CAPSULE STRUCTURE OF POWER UNIT

(71) Applicant: SUBARU CORPORATION, Tokyo (JP)

(72) Inventors: Takashi Tsunoda, Tokyo (JP); Takahito Aoki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/025,158

(22) Filed: Jul. 2, 2018

(65) Prior Publication Data

US 2019/0100249 A1    Apr. 4, 2019

(30) Foreign Application Priority Data

Sep. 29, 2017 (JP) ................................. 2017-189312

(51) Int. Cl.
| | |
|---|---|
| B62D 25/08 | (2006.01) |
| B60K 6/40 | (2007.10) |
| B60K 13/04 | (2006.01) |
| F02F 7/00 | (2006.01) |
| B60R 13/08 | (2006.01) |

(52) U.S. Cl.
CPC .............. B62D 25/082 (2013.01); B60K 6/40 (2013.01); B60K 13/04 (2013.01); B60R 13/0838 (2013.01); F02F 7/0068 (2013.01); B60Y 2200/92 (2013.01)

(58) Field of Classification Search
CPC ................................................... B62D 25/082
See application file for complete search history.

(56) References Cited

U.S. PATENT DOCUMENTS

| | | | | |
|---|---|---|---|---|
| 4,976,307 A | * | 12/1990 | Hall | ......................... F28F 11/02 138/89 |
| 2016/0161147 A1 | * | 6/2016 | Lorenson | ................... F24H 3/06 123/41.49 |
| 2016/0375927 A1 | | 12/2016 | Schulz et al. | |

FOREIGN PATENT DOCUMENTS

| | | |
|---|---|---|
| JP | 2008-044594 | 2/2008 |
| JP | 2013-119384 A | 6/2013 |
| JP | 2016-199123 | 12/2016 |

OTHER PUBLICATIONS

Japanese Office Action issued for Application No. 2017-083530 dated Feb. 26, 2019.

\* cited by examiner

*Primary Examiner* — James A Shriver, II
*Assistant Examiner* — James J Triggs
(74) *Attorney, Agent, or Firm* — Troutman Sanders LLP

(57) ABSTRACT

A vehicle with a capsule structure of a power unit includes the power unit and a transmission member. The power unit includes an internal combustion engine that combusts air-fuel mixture in an engine body and outputs a driving force, and a motor that outputs a driving force by using electric power of an electric generator or a battery. The transmission member transmits the driving force of the power unit. The capsule structure includes a heat-insulation casing having an internal space in which the power unit and the transmission member are accommodated, and a partition wall that divides the internal space of the heat-insulation casing into at least a first partition space and a second partition space which are separated from one another. At least the engine body is disposed in the first partition space, and at least the battery is disposed in the second partition space.

20 Claims, 5 Drawing Sheets

VEHICLE WITH CAPSULE STRUCTURE OF POWER UNIT

CROSS-REFERENCE TO RELATED APPLICATIONS

The present application claims priority from Japanese Patent Application No. 2017-189312 filed on Sep. 29, 2017, the entire contents of which are hereby incorporated by reference.

BACKGROUND

1. Technical Field

The present invention relates to a vehicle with a capsule structure of a power unit such as an internal-combustion engine and a motor.

2. Related Art

In the automobile industry, an electric automobile using a power unit including a battery and a motor has been developing in recent years. The motor outputs a driving force by using electric power of an electric generator or a battery. Realizing the practical use of the electric automobile depends on the progress of development. Therefore, now and in the near future, it is hard to imagine that an internal-combustion engine for combusting air-fuel mixture in an engine body is no longer in use in an automobile such as a hybrid automobile.

The internal-combustion engine that outputs a driving force by combusting air-fuel mixture in an engine body has been required to improve the fuel economy performance. To address this, an engine body covered by a capsule structure has been proposed, for example, in Japanese Unexamined Patent Application Publication No. 2013-119384. This closed capsule structure can keep the temperature of the engine body for a long time while the engine is stopped, and after that, the engine body which is kept warm can be restarted. The engine body is kept warm and restarted, and therefore it is possible to improve the fuel economy performance compared to when the cooled engine body is restarted. In addition, if the temperature of an electric drive device such as an electric generator, a battery, and a motor is low, the output of the battery is reduced, and therefore the cruising range is decreased. To avoid this problem, the electric drive device such as a battery may also need to be accommodated in the capsule structure.

SUMMARY OF THE INVENTION

An aspect of the present invention provides a vehicle with a capsule structure of a power unit including the power unit and a transmission member. The power unit includes an internal combustion engine configured to combust air-fuel mixture in an engine body and output a driving force, and a motor configured to output a driving force by using electric power of an electric generator or a battery. The transmission member is configured to transmit the driving force of the power unit. The capsule structure includes a heat-insulation casing having an internal space in which the power unit and the transmission member are accommodated, and a partition wall configured to divide the internal space of the heat-insulation casing into at least a first partition space and a second partition space which are separated from one another. At least the engine body is disposed in the first partition space, and at least the battery is disposed in the second partition space.

DETAILED DESCRIPTION

Figure 1:
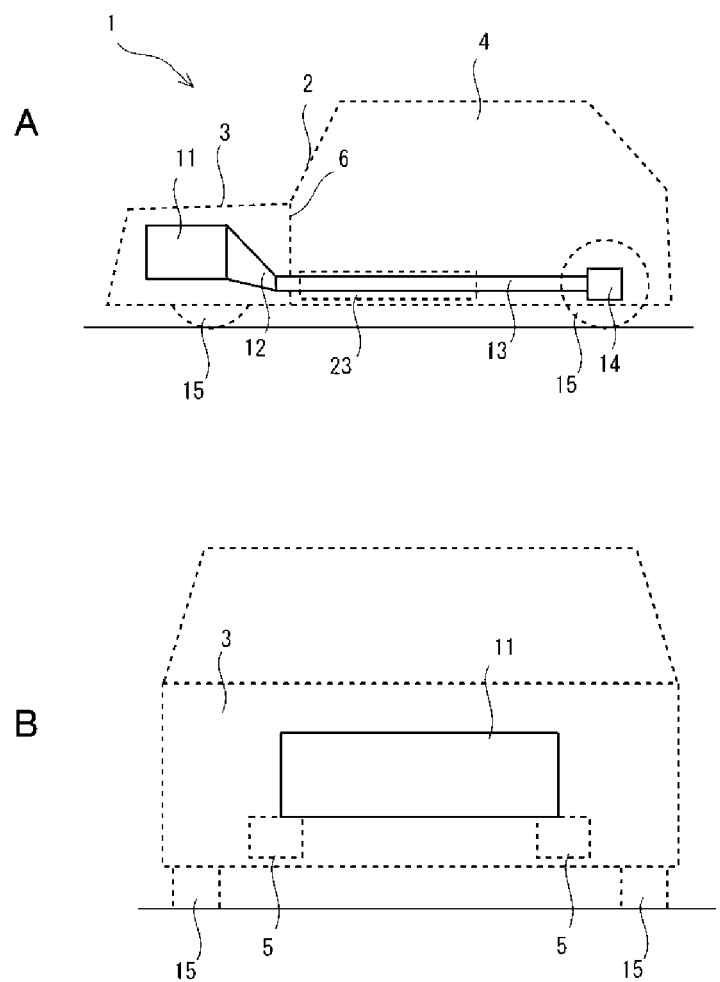
FIG. 1 illustrates a vehicle according to an example of the present invention.

Hereinafter, an example of the present invention will be described with reference to the drawings. Note that the following description is directed to an illustrative example of the present invention and not to be construed as limiting to the present invention. Factors including, without limitation, numerical values, shapes, materials, components, positions of the components, and how the components are coupled to each other are illustrative only and not to be construed as limiting to the present invention. Further, elements in the following example which are not recited in a most-generic independent claim of the present invention are optional and may be provided on an as-needed basis. The drawings are schematic and are not intended to be drawn to scale. Throughout the present specification and the drawings, elements having substantially the same function and configuration are denoted with the same reference numerals to avoid any redundant description.

An engine body of the internal combustion engine, and an exhaust member such as an exhaust pipe generate a lot of heat. Therefore, if a battery is accommodated in a capsule structure, the temperature of the battery may be raised over a desired operation temperature of the battery. If the battery is overheated, its performance deteriorates.

It is desirable to provide a vehicle with a capsule structure of a power unit to improve the performance of the power unit in practical use.

FIG. 1 illustrates an automobile 1 according to an example of the present invention. The automobile 1 is an example of vehicles. FIG. 1A is a schematic side perspective view illustrating the automobile 1. FIG. 1B is a schematic front perspective view illustrating the automobile 1.

The automobile 1 illustrated in FIG. 1 includes a vehicle body 2. A front compartment 3 is provided in the front part of the vehicle body 2. A pair of front beams 5, as a framework member of the automobile 1, extends in the front compartment 3. In addition, a toe board 6, as a partition wall (structural member), is provided between the front compartment 3 and a passenger compartment 4. A power unit including an engine body 11, a transmission 12, and do forth is disposed in the front compartment 3. In addition, a propeller shaft 13 is provided under the floor of the vehicle body 2 to extend from the front compartment 3 to the back of the vehicle body 2. The propeller shaft 13 is a transmission member, and a rear differential gearbox 14 coupled to a rear wheel 15 (axle) is provided at the rear end of the propeller shaft 13. The engine body 11 ignites and combusts air-fuel mixture of gasoline and the air introduced through an air cleaner 16 and an induction pipe 17 in a combustion chamber, moves a piston down with an expanding pressure of the combusted air-fuel mixture, and rotates an output axis coupled to the piston. In addition, the combusted air-fuel mixture is discharged to the outside through an open exhaust valve and an exhaust pipe 18. A rotary drive force of the output shaft generated by the engine body 11 is reduced by the transmission 12, and transmitted to the rear wheel 15 through the propeller shaft 13, the rear differential gearbox 14, and a rear axle shaft. Then, part of the rotary drive force is divided by the transmission 12, and transmitted to a front wheel 15 through a front axle shaft (not illustrated).

In the automobile industry, an electric automobile using a power unit including a battery and a motor 24 has been developing in recent years. Realizing the practical use of the electric automobile depends on the progress of development. Therefore, now and in the near future, it is hard to imagine that an internal-combustion engine for combusting air-fuel mixture in the engine body 11 is no longer in use in the automobile 1 such as a hybrid automobile. The internal-combustion engine that combusts air-fuel mixture in the engine body 11 will be required to improve the fuel economy performance in the future. Also, the power unit including the engine body 11 is required to improve the fuel economy performance in use.

Figure 2:
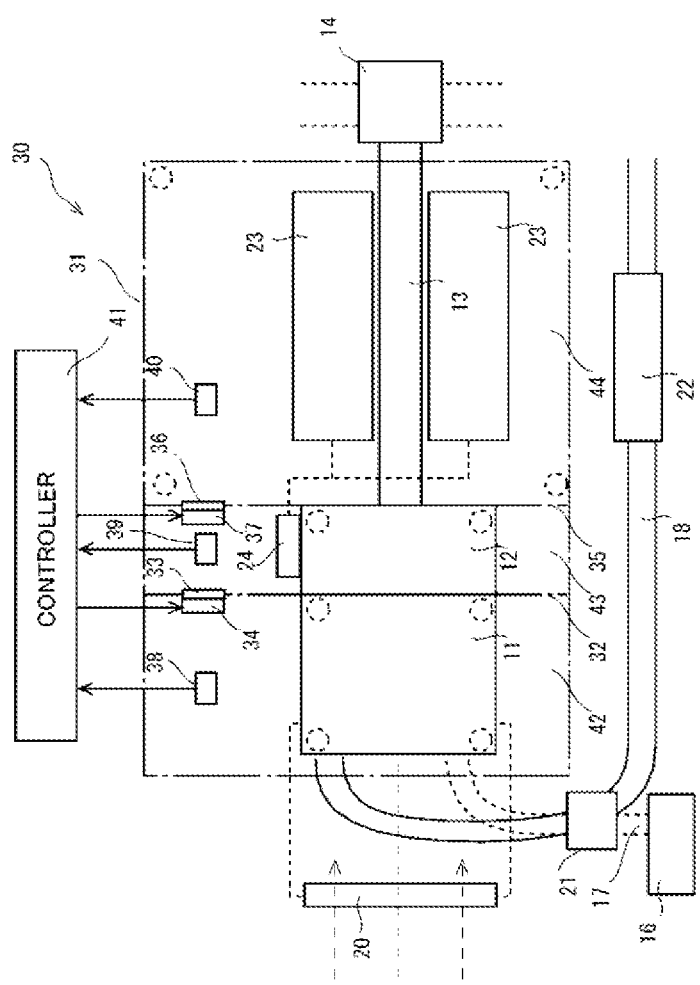
FIG. 2 illustrates a power unit and a capsule apparatus provided in the vehicle illustrated in FIG. 1.

FIG. 2 illustrates a power unit and a capsule apparatus 30 provided in the automobile 1 illustrated in FIG. 1.

FIG. 2 illustrates the internal combustion engine as a power unit provided in automobile 1, which includes the engine body 11, an oil pan, a radiator 20, the air cleaner 16, the induction pipe 17, the exhaust pipe 18, a turbomachinery 21, a catalytic machinery 22, the transmission 12, the propeller shaft 13, and the rear differential gearbox 14. The oil pan formed integrally with the engine body 11 protrudes under the engine body 11. The engine body 11 and the transmission 12 are lubricated with oil. The radiator 20, the air cleaner 16, the induction pipe 17, the exhaust pipe 18, the turbomachinery 21, and the catalytic machinery 22 are engine accessories for use with the engine body 11. In addition, engine accessories include, for example, the motor 24, an electric generator, a battery, a distributor, an injector, a fuel tank, and a pump (not illustrated). These engine accessories are used with the engine body 11 to assist the operation of the engine body 11 to maintain the state of the engine body 11 within an appropriate range for the combustion.

Moreover, FIG. 2 illustrates an electric drive power unit including buttery modules 23 and the motor 24 provided in the automobile 1. In addition, the electric drive power unit may include an electric generator and so forth. The battery modules 23 are provided under the floor of the passenger compartment 4 on each side of a tunnel accommodating the propeller shaft 13 in the width direction of the automobile 1. Each of the battery modules 23 includes a plurality of battery cells, an inverter, a cooling circuit and so forth. The motor 24 is operated by using the electric power accumulated in the battery modules 23, and the electric power generated by the electric generator. The motor 24 is formed integrally with the transmission 12 to transmit the driving force from the transmission 12 to the driving system.

Figure 3:
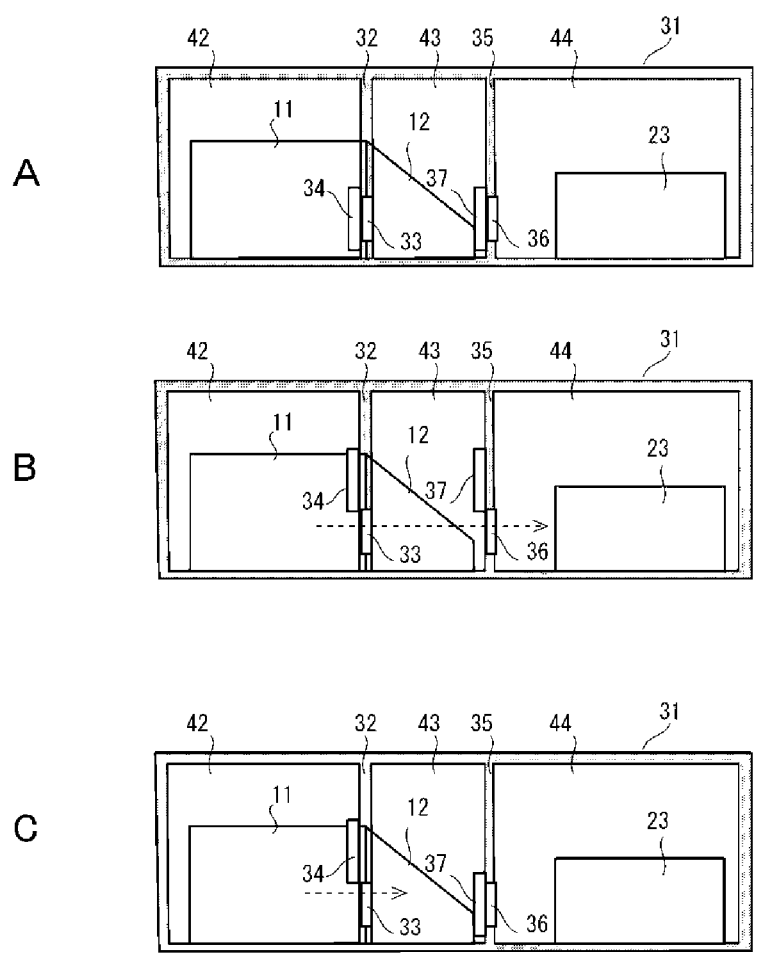
FIG. 3 illustrates the opening and closing state of the capsule apparatus illustrated in FIG. 2.

Moreover, FIG. 2 illustrates the capsule apparatus 30 configured to enclose the power unit including, for example, the engine body 11. FIG. 3 illustrates the opening and closing state of the capsule apparatus 30 illustrated in FIG. 2. The capsule apparatus 30 includes a casing 31, a front partition wall 32, a front opening 33, a front open-close member 34, a rear partition wall 35, a rear opening 36, a rear open-close member 37, a front temperature sensor 38, a middle temperature sensor 39, a rear temperature sensor 40 and a controller 41.

The casing 31 has an approximately boxy shape with internal space to accommodate the power unit and the transmission members. The casing 31 is made of a heat insulating material. The casing 31 has a box shape which is one size larger than a size to accommodate the power unit and the transmission members. In order to secure the seal of the casing 31, a boot (not illustrated) which is made of, for example, a rubber material or a resin material, is provided around the propeller shaft 13, the induction pipe 17, and the exhaust pipe 18 protruding outward from the casing 31. By this means, the casing 31 hermetically encloses the power unit and the transmission members while providing an air layer around the power unit and the transmission members. The casing 31 encloses the engine body 11, the transmission 12, the battery modules 23 and so forth. Components lubricated with oil can be accommodated in the casing 31. Meanwhile, approximately the entire exhaust pipe 18, the turbomachinery 21, the catalytic machinery 22, the air cleaner 16, and approximately the entire induction pipe 17 are provided outside the casing 31. By this means, it is possible to prevent the combusted air-fuel mixture discharged from the exhaust system, which has a high temperature, from staying in the casing 31. Here, the engine accessories such as the electric generator, the buttery, the distributor, the fuel tank, and the pump may be provided inside or outside the casing 31. As illustrated in FIG. 1, the front part of the casing 31 is disposed in the front compartment 3 where the engine body 11 is placed on the casing 31, and the casing 31 and the engine body 11 are mounted to and supported by the pair of front beams 5 of the vehicle body 2 at the same positions. The rear part of the casing 31 is mounted to and supported by the lower surface of floor of the passenger compartment 4. As illustrated in FIG. 1B, the casing 31 is provided not to protrude downward from the pair of front beams 5. By this means, the minimum ground height of the vehicle body 2 can be same as that when the casing 31 is not provided. The part of the casing 31 at which the front partition wall 32 is formed, and the part of the casing 31 at which the rear partition wall 35 is formed are mounted to and supported by the framework member or the structural member of the automobile 1.

The front partition wall 32 and the rear partition wall 35 are made of a heat insulating material. The front partition wall 32 and the rear partition wall 35 may be formed with a heat-insulation structure which is the same as that of the casing 31, or may be formed with a heat-insulation performance lower than that of the casing 31. The front partition wall 32 and the rear partition wall 35 are formed with the casing 31 in a single piece. The front partition wall 32 and the rear partition wall 35 divide the internal space of the casing 31. By this means, the internal space of the casing 31 is divided into a front partition space 42, a middle partition space 43, and a rear partition space 44. At least the engine body 11 is disposed in the front partition space 42. At least the transmission 12 is disposed in the middle partition space 43. At least the battery modules 23 are disposed in the rear partition space 44.

The front opening 33 is formed in the front partition wall 32 to communicate between the front partition space 42 and the middle partition space 43. The front open-close member 34 is formed integrally with the front partition wall 32 and slides to open and close the front opening 33. The rear opening 36 is formed in the rear partition wall 35 to communicate between the middle partition space 43 and the rear partition space 44. The rear open-close member 37 is formed integrally with the rear partition wall 35 and slides to open and close the rear opening 36. In FIG. 3A, the front opening 33 and the rear opening 36 are closed. In this case, the front partition space 42, the middle partition space 43, and the rear partition space 44 are separated from each other. In FIG. 3B, the front opening 33 and the rear opening 36 are open. In this case, the front partition space 42, the middle partition space 43, and the rear partition space 44 communicate with each other. In FIG. 3C, the front opening 33 is open, and the rear opening 36 is closed. In this case, the front partition space 42 and the middle partition space 43 communicate with one another, and the rear partition space 44 and the middle partition space 43 are separated from one another. By providing the front open-close member 34 and the rear open-close member 37 in the casing 31, it is possible to prevent the front open-close member 34 and the rear open-close member 37 from protruding downward from the casing 31. As illustrated in FIG. 1, the casing 31 is provided not to protrude downward from the pair of front beams 5.

The front temperature sensor 38 is disposed in the front partition space 42 of the casing 31 and detects the temperature of the front partition space 42 in which the engine body 11 is disposed. The middle temperature sensor 39 is disposed in the middle partition space 43 of the casing 31, and detects the temperature of the middle partition space 43 in which the transmission 12 is disposed. The rear temperature sensor 40 is disposed in the rear partition space 44 of the casing 31, and detects the temperature of the rear partition space 44 in which the battery modules 23 are disposed.

The front temperature sensor 38, the middle temperature sensor 39, the rear temperature sensor 40, the front open-close member 34, and the rear open-close member 37 are coupled to the controller 41. The controller 41 controls the front open-close member 34 and the rear open-close member 37, and separately controls the opening and closing of the front opening 33 and the rear opening 36, based on the correlation of the temperatures measured by the front temperature sensor 38, the middle temperature sensor 39, and the rear temperature sensor 40, as the condition of the vehicle 1. The controller 41 may be implemented by, for example, a microcomputer. The controller 41 may be mounted to the casing 31 as a dedicated circuit, or provided as a function of an ECU (engine control unit) that controls the automobile 1.

Figure 4:
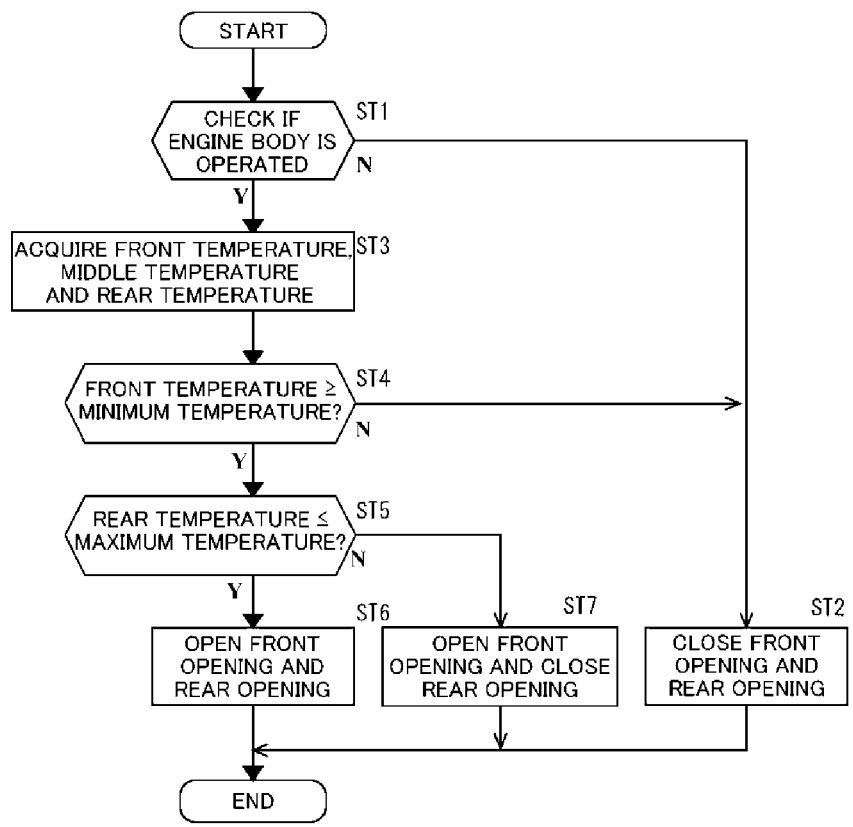
FIG. 4 is a flowchart illustrating a process to control the opening and closing performed by a controller illustrated in FIG. 2.

FIG. 4 is a flowchart illustrating a process to control the opening and closing performed by the controller 41. The controller 41 repeatedly performs the process to control the opening and closing illustrated in FIG. 4.

In the process illustrated in FIG. 4, the controller 41 first checks if the engine body 11 is operated (step ST1). The controller 41 acquires information on the control of the engine body 11 by the ECU, and checks if the engine body 11 is operated. When the engine body 11 is not operated, that is, the engine body 11 is stopped, the controller 41 closes the front opening 33 and the rear opening 36 (step ST2). By this means, the casing 31 is sealed, and the inside of the casing 31 is kept warm by the heat-insulation structure.

On the other hand, when the engine body 11 is operated, the controller 41 acquires a front temperature of the front temperature sensor 38, a middle temperature of the middle temperature sensor 39, and a rear temperature of the rear temperature sensor 40 (step ST3). Then, the controller 41 starts a control to separately open and close the openings based on the correlation of those temperatures.

The controller 41 first compares the front temperature to the minimum temperature of the engine body 11. The minimum temperature of the engine body 11 may be a lowest temperature suitable to operate the engine body 11. To be more specific, for example, the minimum temperature may be a temperature at which the viscosity of the oil used in the engine body 11 is higher than a desired viscosity suitable to operate the engine body 11. When the front temperature is lower than the minimum temperature of the engine body 11, the controller 41 closes the front opening 33 and the rear opening 36 (step ST2). By this means, the engine body 11 is efficiently warmed by the own heat.

When the front temperature is equal to or higher than the minimum temperature of the engine body 11, the controller 41 compares the rear temperature to the maximum temperature of the battery modules 23 (step ST5). The maximum temperature of the battery modules 23 may be a highest temperature suitable to operate the battery modules 23. To be more specific, for example, the maximum temperature of the battery modules 23 may be a highest operating temperature not to deteriorate the battery. When the rear temperature is equal to or lower than the maximum temperature of the battery modules 23, the controller 41 opens the front opening 33 and the rear opening 36 (step ST6). By this means, the engine body 11 is efficiently warmed by the own heat. When the rear temperature is higher than the maximum temperature of the battery modules 23, the controller 41 opens the front opening 33 and closes the rear opening 36 (step ST7). By this means, the battery modules 23 are not likely to be heated to a temperature equal to or higher than the maximum temperature.

As described above, with the present example, the power unit and the transmission members are accommodated in the internal space of the casing 31. Therefore, even when the power unit and the transmission members are stopped, it is possible to keep the power unit and the transmission members warm by the heat generated by the internal combustion engine of the power unit. As a result, it is possible to prevent the fuel efficiency of the engine body 11 from decreasing when the engine body 11 is restarted, to prevent supercooling of the battery, and consequently to use the engine body 11 and the battery with approximately the normal performance just after they are restarted. Moreover, the internal space of the casing 31 is divided by the partition walls having a heat-insulation performance lower than that of the casing 31, and at least a first partition space and a second partition space which are separated from one another are formed by the partition walls. The engine body 11 and the battery are disposed separately in the first partition space and the second partition space in the casing 31. By this means, it is possible to keep the engine body 11 and the battery warm at suitable temperatures, respectively. Moreover, a third partition space in which the transmission members are disposed is formed by a partition wall. By this means, it is also possible to keep the transmission members warm at a suitable temperature.

With the present example, the controller 41 controls the opening and closing of the open-close members, based on the temperatures of the partition spaces 42 to 44 divided in the casing 31, or the temperatures of the members disposed in the partition spaces 42 to 44, respectively, and the correlation of the temperatures. By this means, the controller 41 can control the partition spaces 42 to 44 at suitable temperatures, respectively.

With the present example, the front partition wall 32 and the rear partition wall 35 are formed with the casing 31 in a single piece. Therefore, there is no need to mount the front partition wall 32 and the rear partition wall 35 to the framework member or the structural member of the automobile 1 to support the partition wall 32 and the rear partition wall 35. By this means, it is possible to simplify the capsule structure.

With the present example, the part of the casing 31 at which the front partition wall 32 is formed, and the part of the casing 31 at which the rear partition wall 35 is formed are mounted to and supported by the framework member or the structural member of the automobile 1. Therefore, it is easy to mount the casing 31 to the automobile 1, and the casing 31 and the partition walls can be reliably supported by the automobile 1 with the simple mounting. It is possible to securely support the casing 31 by the automobile 1 at the parts of the front partition wall 32 and the rear partition wall 35 with an increased rigidity. For example, compared to a case where casing members such as an engine cover and a bottom cover are individually mounted to the framework member or the structural member of the automobile 1, there is no need to add a complicated process or make a significant change to mount the casing 31 to the automobile 1.

While the above-described examples are preferred examples of the present invention, it is to be understood that the invention is not limited to these examples. The present invention is intended to cover various modification and alteration without departing from the spirit and scope of the present invention.

Figure 5:
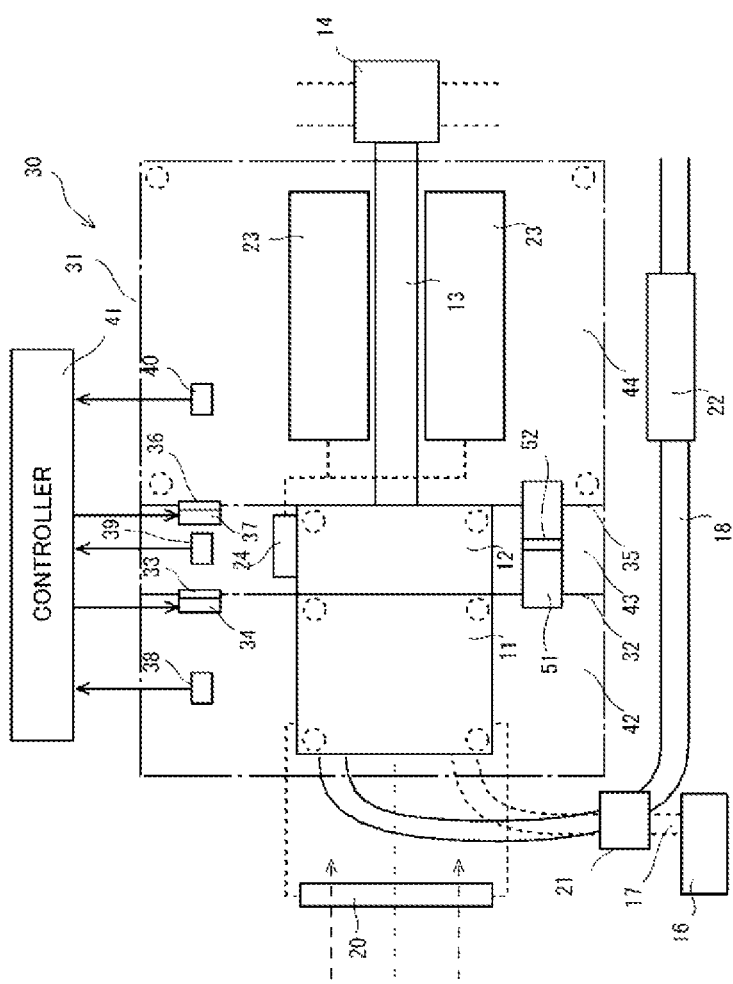
FIG. 5 illustrates a modification of the capsule apparatus illustrated in FIG. 2.

FIG. 5 illustrates a modification of the capsule apparatus 30 illustrated in FIG. 2. The capsule apparatus 30 illustrated in FIG. 5 includes a connection path 51 configured to connect the front partition space 42 directly to the rear partition space 44, and a communication open-close member 52 disposed in the connection path 51. In this case, the front opening 33, the rear opening 36, and the connection path 51 allow the front partition space 42, the middle partition space 43, and the rear partition space 44 to directly communicate with each other. The opening and closing of the front opening 33, the rear opening 36, and the connection path 51 are individually controlled by the front open-close member 34, the rear open-close member 37, and the communication open-close member 52. By this means, each of the partition spaces 42 and 44 can directly receive the heat coming from the other partition space without passing through a third partition space.

With the present example, the internal space of the casing 31 is divided into three spaces, the front partition space 42 in which the engine body 11 is disposed, the middle partition space 43 in which the transmission 12 is disposed, and the rear partition space 44 in which the battery modules 23 are disposed. Alternatively, the internal space of the casing 31 may be divided into two spaces, for example, the front partition space 42 in which the engine body 11 and the transmission 12 are disposed, and the rear partition space 44 in which the battery modules 23 are disposed.

The invention claimed is:

1. A vehicle with a capsule structure of a power unit comprising the power unit and a transmission member,
    the power unit comprising:
        an internal combustion engine configured to combust air-fuel mixture in an engine body and output a driving force; and
        a motor configured to output a driving force by using electric power of an electric generator or a battery, and
    the transmission member being configured to transmit the driving force of the power unit, the capsule structure comprising:
        a heat-insulation casing having an internal space in which the power unit and the transmission member are accommodated; and
        a partition wall configured to divide the internal space of the heat-insulation casing into at least a first partition space and a second partition space which are separated from one another,
    wherein at least the engine body is disposed in the first partition space, and at least the battery is disposed in the second partition space.

2. The vehicle with a capsule structure of a power unit according to claim 1, wherein the partition wall is configured to form a third partition space in which the transmission member is disposed.

3. The vehicle with a capsule structure of a power unit according to claim 1, wherein the capsule structure further comprises:
    a connection path configured to connect at least the first partition space to the second partition space in the heat-insulation casing;
    an open-close member configured to open and close the connection path; and
    a controller configured to control the open-close member to open and close the connection path.

4. The vehicle with a capsule structure of a power unit according to claim 2, wherein the capsule structure further comprises:
    a connection path configured to connect at least the first partition space to the second partition space in the heat-insulation casing;
    an open-close member configured to open and close the connection path; and
    a controller configured to control the open-close member to open and close the connection path.

5. The vehicle with a capsule structure of a power unit according to claim 1, wherein the capsule structure further comprises:
    a first communication member configured to communicate between the first partition space and the second partition space, a second communication member configured to communicate between the second partition space and a third partition space, and a third communication member configured to communicate between the third partition space and the first partition space in the heat-insulation casing;
    a first open-close member configured to open and close the first communication member, a second open-close member configured to open and close the second communication member, and a third open-close member configured to open and close the third communication member; and
    a controller configured to control the first open-close member, the second open-close member, and the third open-close member to individually open and close the first communication member, the second communication member, and the third communication member.

6. The vehicle with a capsule structure of a power unit according to claim 2, wherein the capsule structure further comprises:
    a first communication member configured to communicate between the first partition space and the second partition space, a second communication member configured to communicate between the second partition space and the third partition space, and a third communication member configured to communicate between the third partition space and the first partition space in the heat-insulation casing;
    a first open-close member configured to open and close the first communication member, a second open-close member configured to open and close the second communication member, and a third open-close member configured to open and close the third communication member; and a controller configured to control the first open-close member, the second open-close member, and the third open-close member to individually open and close the first communication member, the second communication member, and the third communication member.

7. The vehicle with a capsule structure of a power unit according to claim 3, wherein the controller controls the opening and closing on a basis of temperatures of the partition spaces divided in the heat-insulation casing, or temperatures of members disposed in the partition spaces.

8. The vehicle with a capsule structure of a power unit according to claim 4, wherein the controller controls the opening and closing on a basis of temperatures of the partition spaces divided in the heat-insulation casing, or temperatures of members disposed in the partition spaces.

9. The vehicle with a capsule structure of a power unit according to claim 5, wherein the controller controls the opening and closing on a basis of temperatures of the partition spaces divided in the heat-insulation casing, or temperatures of members disposed in the partition spaces.

10. The vehicle with a capsule structure of a power unit according to claim 6, wherein the controller controls the opening and closing on a basis of temperatures of the partition spaces divided in the heat-insulation casing, or temperatures of members disposed in the partition spaces.

11. The vehicle with a capsule structure of a power unit according to claim 1, wherein the partition wall is formed with the heat-insulation casing in a single piece.

12. The vehicle with a capsule structure of a power unit according to claim 2, wherein the partition wall is formed with the heat-insulation casing in a single piece.

13. The vehicle with a capsule structure of a power unit according to claim 1, wherein the partition wall or a part of the heat-insulation casing at which the partition wall is formed is mounted to and supported by a framework member or a structural member of the vehicle.

14. The vehicle with a capsule structure of a power unit according to claim 2, wherein the partition wall or a part of the heat-insulation casing at which the partition wall is formed is mounted to and supported by a framework member or a structural member of the vehicle.

15. The vehicle with a capsule structure of a power unit according to claim 1, wherein an exhaust pipe, a turbomachinery, a muffler, and a catalytic machinery of the power unit are provided outside the heat-insulation casing.

16. The vehicle with a capsule structure of a power unit according to claim 2, wherein an exhaust pipe, a turbomachinery, a muffler, and a catalytic machinery of the power unit are provided outside the heat-insulation casing.

17. The vehicle with a capsule structure of a power unit according to claim 1, wherein the heat-insulation casing accommodates components of the power unit including at least one of the internal combustion engine and the motor, and the transmission member which are lubricated with oil.

18. The vehicle with a capsule structure of a power unit according to claim 2, wherein the heat-insulation casing accommodates components of the power unit including at least one of the internal combustion engine and the motor, and the transmission member which are lubricated with oil.

19. The vehicle with a capsule structure of a power unit according to claim 1, wherein the capsule structure further comprises:

a connection path configured to connect at least the first partition space to the second partition space in the heat-insulation casing;

an open-close member configured to open and close the connection path; and circuitry configured to control the open-close member to open and close the connection path.

20. The vehicle with a capsule structure of a power unit according to claim 2, wherein the capsule structure further comprises:

a connection path configured to connect at least the first partition space to the second partition space in the heat-insulation casing;

an open-close member configured to open and close the connection path; and circuitry configured to control the open-close member to open and close the connection path.

* * * * *